(12) United States Patent
Morisaku et al.

(10) Patent No.: US 9,564,668 B2
(45) Date of Patent: Feb. 7, 2017

(54) BATTERY MODULE AND METHOD FOR MANUFACTURING BATTERY MODULE

(71) Applicant: KABUSHIKI KAISHA TOYOTA JIDOSHOKKI, Aichi-ken (JP)

(72) Inventors: Naoto Morisaku, Kariya (JP); Takayuki Kato, Kariya (JP); Shintaro Watanabe, Kariya (JP); Hidefumi Oishi, Kariya (JP); Takashi Sakai, Kariya (JP); Yuki Chujo, Kariya (JP); Hiromi Ueda, Kariya (JP); Kazuki Maeda, Kariya (JP); Hirohisa Kato, Kariya (JP); Tomonori Sasaki, Kariya (JP); Atsushi Yamaguchi, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 65 days.

(21) Appl. No.: 14/650,147

(22) PCT Filed: Dec. 5, 2013

(86) PCT No.: PCT/JP2013/082711
§ 371 (c)(1),
(2) Date: Jun. 5, 2015

(87) PCT Pub. No.: WO2014/091998
PCT Pub. Date: Jun. 19, 2014

(65) Prior Publication Data
US 2015/0318585 A1    Nov. 5, 2015

(30) Foreign Application Priority Data
Dec. 10, 2012   (JP) .................................. 2012-269345

(51) Int. Cl.
*H01M 10/6555*  (2014.01)
*H01M 10/625*  (2014.01)
(Continued)

(52) U.S. Cl.
CPC ......... *H01M 10/625* (2015.04); *H01M 2/1077* (2013.01); *H01M 10/613* (2015.04);
(Continued)

(58) Field of Classification Search
CPC  H01M 10/625; H01M 10/613; H01M 10/647; H01M 10/6554; H01M 10/6555; H01M 2/1077; H01M 2220/20; Y10T 29/4911
(Continued)

(56) References Cited

U.S. PATENT DOCUMENTS 5,756,227 A    5/1998  Suzuki et al.
2003/0017384 A1   1/2003  Marukawa et al.
(Continued)

FOREIGN PATENT DOCUMENTS

CN    102769158    11/2012
JP    8-148187     6/1996
(Continued)

OTHER PUBLICATIONS

Extended European Search Report for EP Appl. No. 13863114.8 dated Aug. 23, 2016.
(Continued)

*Primary Examiner* — Gregg Cantelmo
(74) *Attorney, Agent, or Firm* — Greenblum & Bernstein, P.L.C.

(57) ABSTRACT

A battery module joined to a joint body. Each heat transfer plate of the battery module has a sandwiched portion provided between adjacent battery cells and a joined portion. A first heat conductive layer that contacts a battery cell and has a first thickness is provided on the sandwiched portion of each heat transfer plate. A second heat conductive layer is provided on the facing surface of each heat transfer plate other than the heat transfer plate that is the closest to the joint body when the joined portion is joined to the joint body. The
(Continued)

second heat conductive layer is configured to contact the joint body. The second heat conductive layer on the heat transfer plate that is the farthest from the joint body when the joined portion is joined to the joint body has a second thickness, which is greater than the first thickness.

5 Claims, 5 Drawing Sheets

(51) Int. Cl.
  *H01M 2/10* (2006.01)
  *H01M 10/647* (2014.01)
  *H01M 10/6554* (2014.01)
  *H01M 10/613* (2014.01)

(52) U.S. Cl.
  CPC ..... *H01M 10/647* (2015.04); *H01M 10/6554* (2015.04); *H01M 10/6555* (2015.04); *H01M 2220/20* (2013.01); *Y10T 29/4911* (2015.01)

(58) Field of Classification Search
  USPC ........................................................ 420/120
  See application file for complete search history.

(56) References Cited

U.S. PATENT DOCUMENTS

| | | | | |
|---|---|---|---|---|
| 2009/0061299 A1* | 3/2009 | Uchida | ............... | H01M 2/1077 429/156 |
| 2009/0208829 A1* | 8/2009 | Howard | .............. | F28D 15/0233 429/120 |
| 2010/0119927 A1* | 5/2010 | Bauer | ................. | H01M 2/1083 429/120 |
| 2011/0200862 A1 | 8/2011 | Kurosawa | | |
| 2011/0244299 A1* | 10/2011 | Guener | ............... | B60L 11/1874 429/120 |
| 2011/0293986 A1* | 12/2011 | Kozu | .................... | H01M 2/105 429/120 |
| 2012/0009455 A1* | 1/2012 | Yoon | ................. | H01M 10/6552 429/120 |
| 2012/0171543 A1* | 7/2012 | Hirsch | ..................... | B60K 1/04 429/120 |
| 2012/0177965 A1* | 7/2012 | Lee | ................... | H01M 10/5004 429/99 |
| 2012/0231315 A1* | 9/2012 | Yoon | ................... | H01M 10/657 429/120 |
| 2012/0251865 A1* | 10/2012 | Heckenberger | ..... | H01M 6/5038 429/120 |
| 2013/0157101 A1* | 6/2013 | Heise | ................ | H01M 10/6554 429/120 |
| 2013/0171491 A1 | 7/2013 | Wei et al. | | |
| 2014/0087231 A1 | 3/2014 | Schaefer et al. | | |
| 2016/0072164 A1* | 3/2016 | Jung | ................... | H01M 2/1077 429/120 |

FOREIGN PATENT DOCUMENTS

| | | |
|---|---|---|
| JP | 2003-36819 | 2/2003 |
| JP | 2010-192207 | 9/2010 |
| JP | 2010-192211 | 9/2010 |
| JP | 2011-171029 | 9/2011 |
| JP | 2012-94312 | 5/2012 |
| JP | 2012-94376 | 5/2012 |
| WO | 2012/013789 | 2/2012 |
| WO | 2012/123065 | 9/2012 |
| WO | 2012/147801 | 11/2012 |
| WO | 2012/165493 | 12/2012 |

OTHER PUBLICATIONS

Translation of International Preliminary Report on Patentability for PCT/JP2013/082711 issued on Jun. 16, 2015.
Translation of Written Opinion of the International Search Authority for PCT/JP2013/082711 having a mailing date of Jan. 7, 2014.
Translation of International Search Report for PCT/JP2013/082711 having a mailing date of Jan. 7, 2014.
Official Action for JP 2012-269345 having a mailing date of Jun. 2, 2015.
Official Action for JP Appl. No. 201380062810.3 dated Sep. 18, 2016.

* cited by examiner

BATTERY MODULE AND METHOD FOR MANUFACTURING BATTERY MODULE

TECHNICAL FIELD

The present invention relates to a battery module that includes heat transfer plates between battery cells and to a method for manufacturing the battery module.

BACKGROUND ART

Patent Document 1 describes a battery assembly, which is an example of a battery module formed by battery cells that are arranged side by side. The battery assembly of Patent Document 1 includes electric cells (battery cells) and heat transfer plates, each of which is arranged between adjacent ones of the electric cells. The heat transfer plates exchange heat with the electric cells and the outside air in a suitable manner, thereby cooling the electric cells.

PRIOR ART DOCUMENTS

Patent Documents

Patent Document 1: Japanese Laid-Open Patent Publication No. 8-148187

SUMMARY OF THE INVENTION

Problems that the Invention is to Solve

Further improvement is desired in the cooling efficiency of electric cells in a battery assembly.

It is an objective of the present invention to provide a battery module that improves the cooling efficiency of battery cells and a method for manufacturing the battery module.

Means for Solving the Problems

To achieve the foregoing objective and in accordance with one aspect of the present invention, a battery module configured to be joined to a joint body is provided. The battery module includes a plurality of battery cells and a plurality of heat transfer plates, each of which is located between adjacent ones of the battery cells. Each heat transfer plate includes a sandwiched portion, which is located between adjacent ones of the battery cells, and a joined portion, which is configured to be joined to the joint body and includes a facing surface that faces the joint body. A first heat conductive layer that is in contact with at least one of the battery cells is located on the sandwiched portion of each heat transfer plate. The first heat conductive layer has a first thickness between a part that is in contact with the sandwiched portion and a part that is in contact with the battery cell. A second heat conductive layer is located on the facing surface of each of the heat transfer plates except for one of the heat transfer plates that is the closest to the joint body when the joined portions are joined to the joint body. The second heat conductive layer is configured to contact the joint body. The second heat conductive layer on one of the heat transfer plates that is the farthest from the joint body when the joined portions are joined to the joint body has a second thickness between a part that is in contact with the joined portion and a part that is in contact with the joint body, and the second thickness is greater than the first thickness.

MODES FOR CARRYING OUT THE INVENTION

A battery module according to one embodiment will now be described with reference to FIGS. 1 to 7. The battery module is mounted on a forklift. In the following descriptions, the terms "front", "rear", "left", "right", "up", and "down" are based on a state in which a forklift operator faces the front of the forklift.

Figure 1:
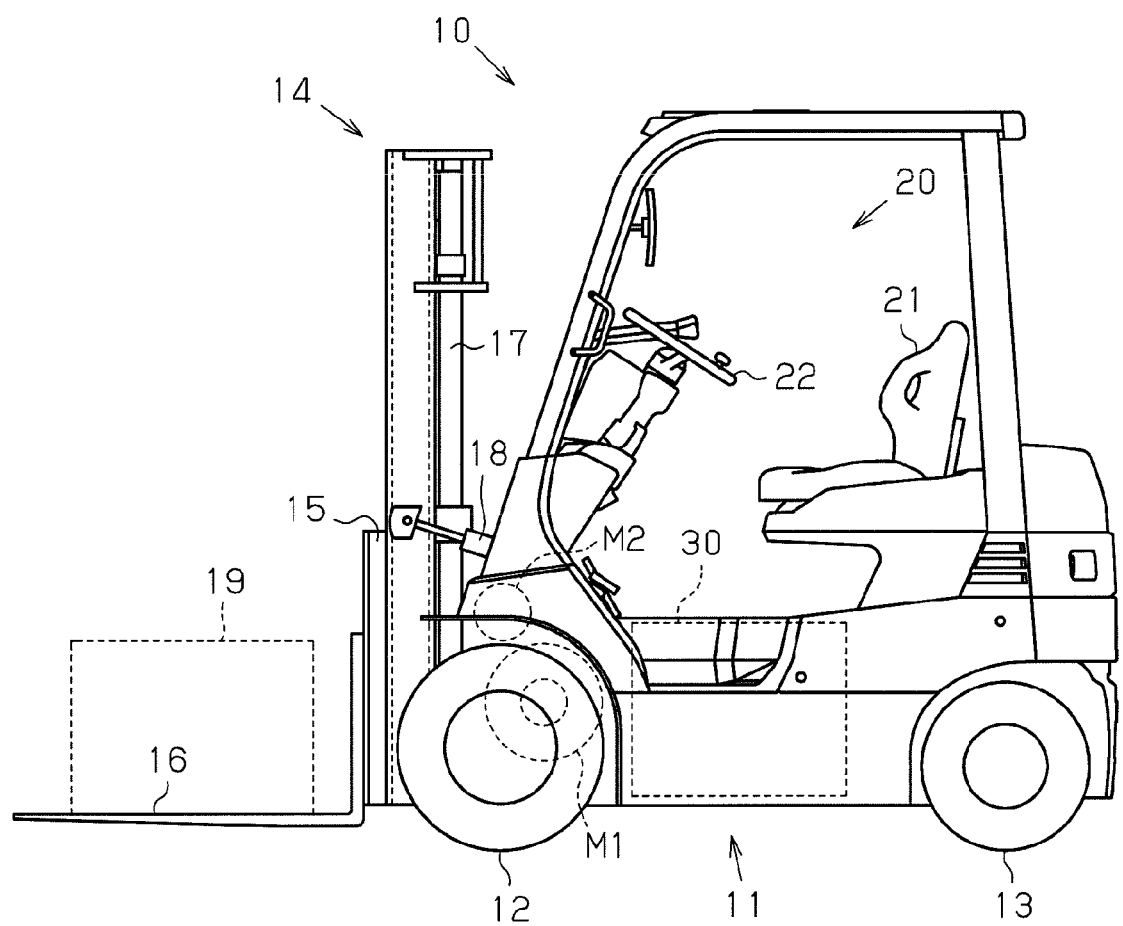
FIG. 1 is a schematic side view showing a forklift including a battery module according to one embodiment.

As shown in FIG. 1, a forklift 10, which is an industrial vehicle, includes a vehicle body 11, drive wheels 12, which are located in the front lower section of the vehicle body 11, steered wheels 13, which are located in the rear lower section of the vehicle body 11, and a material handling device, which is located in front of the vehicle body 11. The material handling device includes a mast 14, which is arranged in front of the vehicle body 11, and a pair of right and left forks 16, which is coupled to the mast 14 by a lift bracket 15. A lift cylinder 17 is coupled to the mast 14 and driven to lift and lower the forks 16 with the lift bracket 15. A tilt cylinder 18 is coupled to the mast 14 and driven to tilt the forks 16 and the mast 14. A carried load 19 is mounted on the forks 16. The vehicle body 11 includes a drive motor M1, which functions as the driving source of the drive wheels 12, and a material handling motor M2, which functions as the driving source of the forks 16.

Further, the vehicle body 11 includes an operator cab 20 at the center. The operator cab 20 includes an operator seat 21, on which the operator (driver) sits. A steering wheel 22 is located in front of the operator seat 21. A battery pack 30 is located under the operator cab 20. The details of the battery pack 30 are given below.

Figure 2:
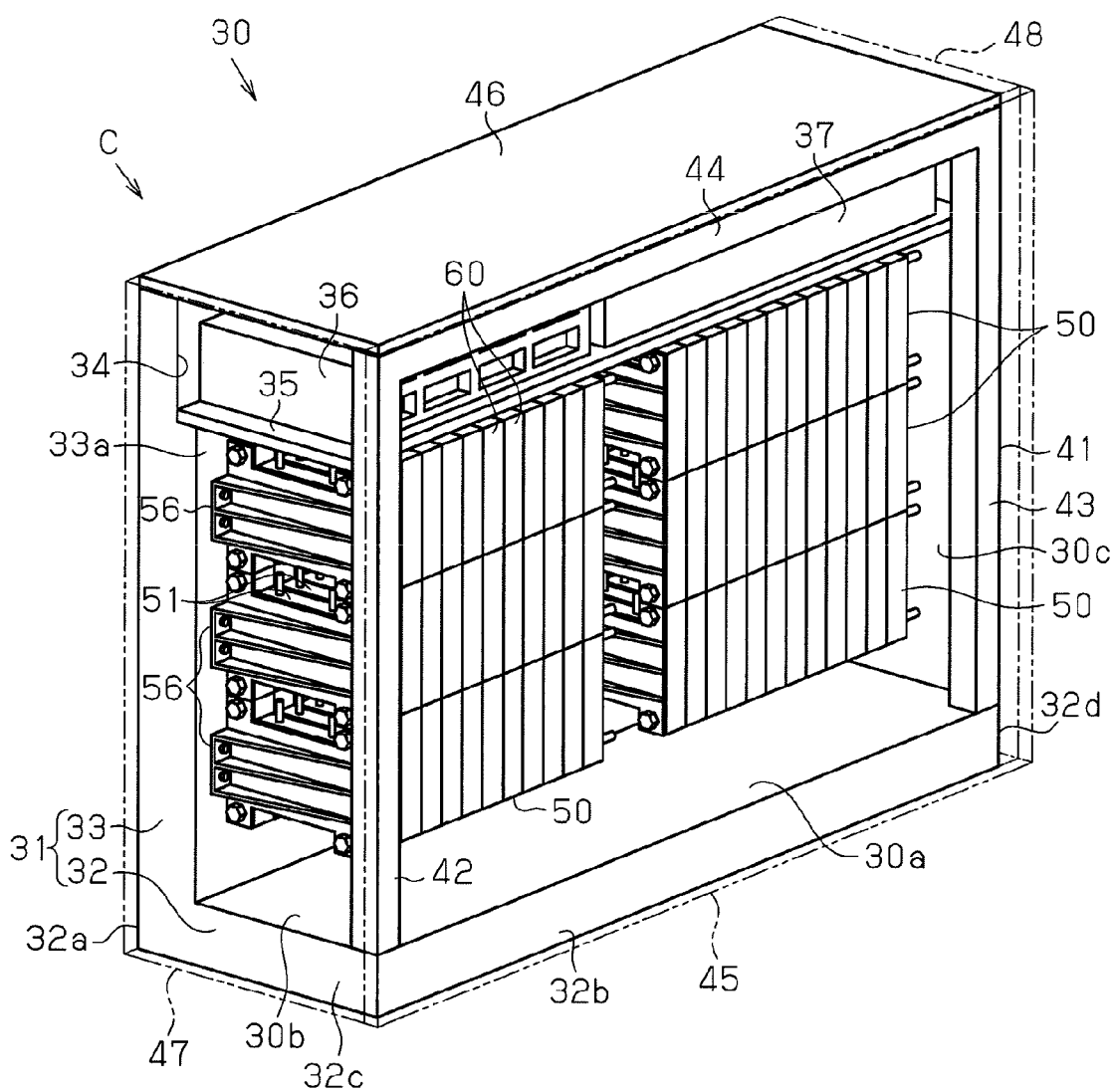
FIG. 2 is a perspective view showing a battery pack including battery modules of the embodiment.

As shown in FIG. 2, the battery pack 30 includes a case C, which includes a counterweight 31, which counterbalances the carried load 19 mounted on the forks 16. The counterweight 31 includes a weight portion 32, which has the shape of a rectangular solid, and a weight body 33, which has the shape of a rectangular plate. The weight body 33 projects from a first end 32a in the transverse direction of the weight portion 32 and in the thickness direction of the weight portion 32. The weight body 33 also extends from a first end 32c to a second end 32d in the longitudinal direction of the weight portion 32. In other words, the weight portion 32 projects from the proximal end of the weight body 33 and in the thickness direction of the weight body 33. The distal end of the weight body 33 (the end opposite to the proximal end of the weight body 33) includes a cutout section 34, in which the weight body 33 is cut out in the thickness direction of the weight body 33.

A frame 41 projects from a second end 32b in the transverse direction of the weight portion 32. The frame 41 is apart from the weight body 33 and substantially has the shape of inverted letter U. The frame 41 includes a first column 42 and a second column 43, which project from the upper surface of the weight portion 32 at the two corners on the second end 32b in the transverse direction, and a base 44, which connects the upper ends of the first column 42 and the second column 43 (the ends opposite to the ends that are connected to the weight portion 32). That is, the battery pack 30 includes a front opening 30a, which is surrounded by the weight portion 32 and the frame 41, at the second end 32b in the transverse direction of the weight portion 32. The front opening 30a is closed by a lid 45, which has the shape of a rectangular plate.

The dimension of the columns 42 and 43 in the projecting direction (the dimension of the columns 42 and 43 in the longitudinal direction) is equal to the minimum dimension between the upper surface of the weight portion 32 and the distal end surface of the weight body 33. The upper surface of the frame 41 and the upper surface of the weight body 33 support a top panel 46, which closes the opening (not shown) between the weight body 33 and the frame 41. Further, the battery pack 30 includes a first opening 30b at the first end 32c in the longitudinal direction of the weight portion 32. The first opening 30b is surrounded by the weight body 33, the weight portion 32, the first column 42, and the top panel 46. The battery pack 30 also includes a second opening 30c at the second end 32d in the longitudinal direction of the weight portion 32. The second opening 30c is surrounded by the weight body 33, the weight portion 32, the second column 43, and the top panel 46. A first lid 47 closes the first opening 30b, and a second lid 48 closes the second opening 30c. The counterweight 31, the frame 41, the top panel 46, and the lids 45, 47 and 48 form the case C.

The cutout section 34 forms a horizontal mount surface at a position lower than the distal end surface of the weight body 33. A mount panel 35, which is a rectangular flat plate, is fixed to the mount surface. An accommodation case 36 and a junction box 37 are located on the mount panel 35. The accommodation case 36 accommodates a controller that controls battery modules 50, which will be described below. The junction box 37 accommodates relays and wires.

The weight body 33, which serves as a joint body, has a surface in the thickness direction (the inner surface of the case C) that functions as an arrangement surface 33a, on which the battery modules 50 are arranged. The battery modules 50 are arranged side by side on the arrangement surface 33a. In the present embodiment, two battery lines, each of which includes three battery modules 50 arranged in the transverse direction of the weight body 33, are arranged in the longitudinal direction of the weight body 33.

Figure 3:
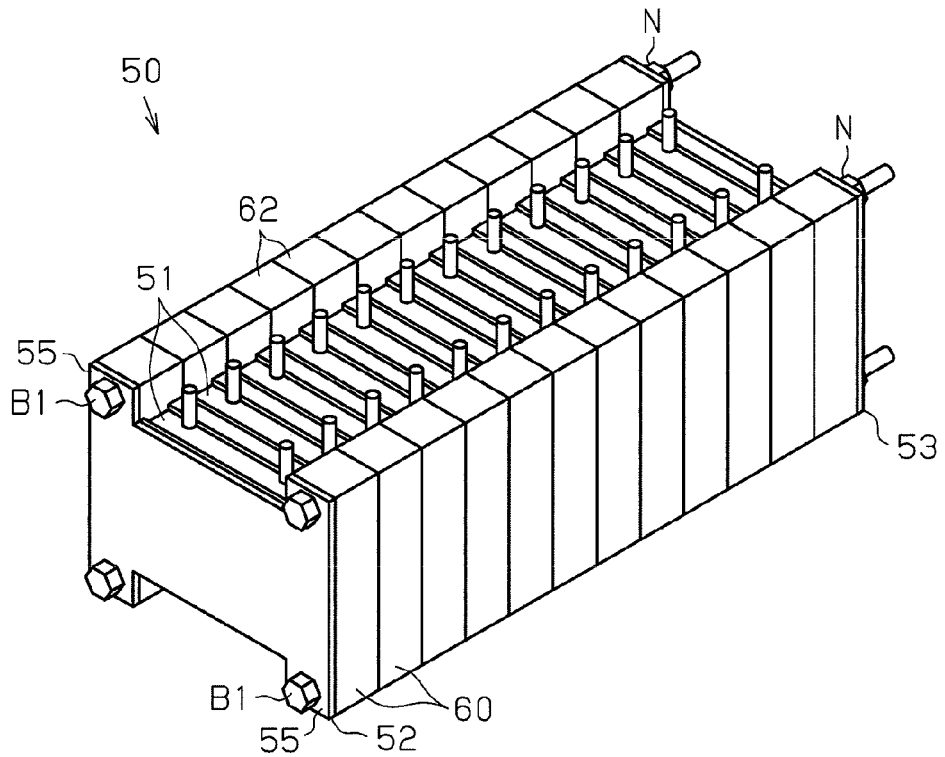
FIG. 3 is a perspective view showing a battery module of the embodiment.
Figure 4:
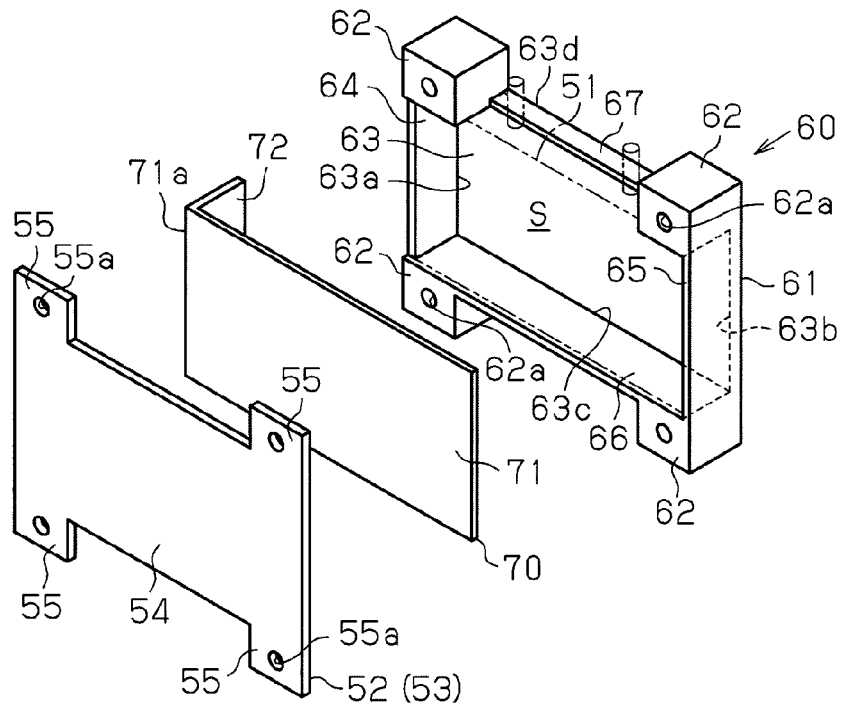
FIG. 4 is a perspective view showing the relationship of an end plate, a heat transfer plate, and a battery holder of the battery module of FIG. 3.
Figure 5:
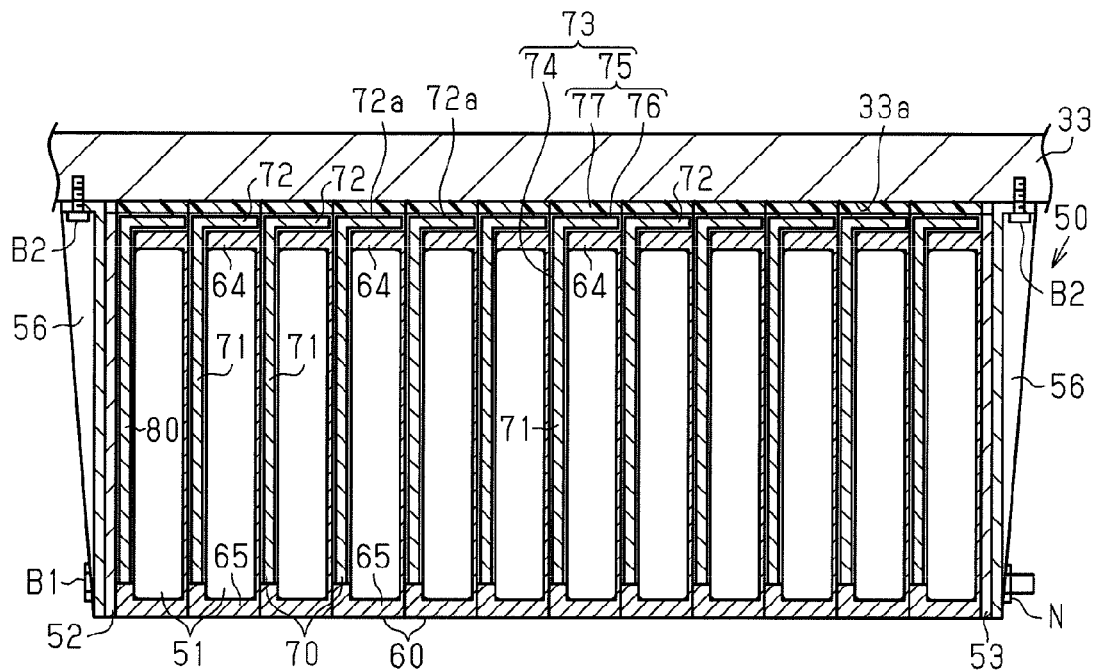
FIG. 5 is a cross-sectional view showing the battery module of FIG. 3.

As shown in FIGS. 3 to 5, each battery module 50 includes battery holders 60 and rectangular batteries 51, which serve as battery cells and are held by the battery holders 60. The rectangular batteries 51 are arranged side by side in the thickness direction of the rectangular batteries 51. A heat transfer plate 70 is arranged between adjacent ones of the rectangular batteries 51. End plates 52 and 53 are arranged at the opposite ends of the battery module 50 in the arrangement direction of the rectangular batteries 51. An end portion plate 80 is located between the end plate 52 and the rectangular battery 51 that is adjacent to the end plate 52. The end portion plate 80 is identical in shape with the heat transfer plates 70. Bolts B1 are inserted through the end plate 52, the battery holders 60, and the end plate 53 and then fastened to nuts N to assemble the battery module 50. Thus, the end plates 52 and 53 sandwich and hold the rectangular batteries 51 in the arrangement direction of the rectangular batteries 51.

As shown in FIG. 4, each battery holder 60 includes a holder main body 61, which has the shape of a rectangular box, and legs 62, which have the shape of a rectangular solid. The legs 62 project from the four corners of the outer surface of the holder main body 61. Specifically, the holder main body 61 includes a first covering portion 63, which has the shape of a rectangular flat plate, and a second covering portion 64, which has the shape of a rectangular flat plate and extends in the thickness direction of the first covering portion 63 and from a first end 63a in the longitudinal direction of the first covering portion 63. A third covering portion 65, which has the shape of a rectangular flat plate, extends in the thickness direction of the first covering portion 63 and from a second end 63b in the longitudinal direction of the first covering portion 63. A fourth covering portion 66, which has the shape of a rectangular flat plate, extends in the thickness direction of the first covering portion 63 and from a first end 63c in the transverse direction of the first covering portion 63. A fifth covering portion 67, which has the shape of a rectangular flat plate, extends in the thickness direction of the first covering portion 63 and from a second end 63d in the transverse direction of the first covering portion 63. The covering portions 63 to 67 surround a region that functions as an accommodation portion S that accommodates a rectangular battery 51. The transverse dimension of the fifth covering portion 67 is slightly shorter than the transverse dimension of the fourth covering portion 66.

The legs 62 project from the opposite ends in the longitudinal direction of each of the second covering portion 64 and the third covering portion 65 and in the longitudinal direction of the associated one of the covering portions 64 and 65. An insertion hole 62a, through which a bolt B1 is inserted, extends through each leg 62 and in the longitudinal direction of the leg 62.

Each of the end plates 52 and 53 includes a base 54, which has the shape of a rectangular flat plate, and protrusions 55, which protrude from the four corners of the base 54 and have the shape of a rectangular flat plate. An insertion hole 55a, through which a bolt B1 is inserted, extends through each, protrusion 55 and in the thickness direction of the protrusion 55.

Each heat transfer plate 70 includes a sandwiched portion 71 and a joined portion 72. The sandwiched portion 71 has the shape of a rectangular flat plate and is arranged between rectangular batteries 51, and the joined portion 72 has the shape of a rectangular flat plate and extends in the thickness direction of the sandwiched portion 71 and from a first longitudinal end 71a of the sandwiched portion 71. The joined portion 72 covers the second covering portion 64 of the battery holder 60. Thus, the joined portion 72 is exposed out of the battery module 50 in the position corresponding to the second covering portion 64 of the battery holder 60. The sandwiched portion 71 is sandwiched by the surfaces of the rectangular batteries 51 in the thickness direction.

Figure 6:
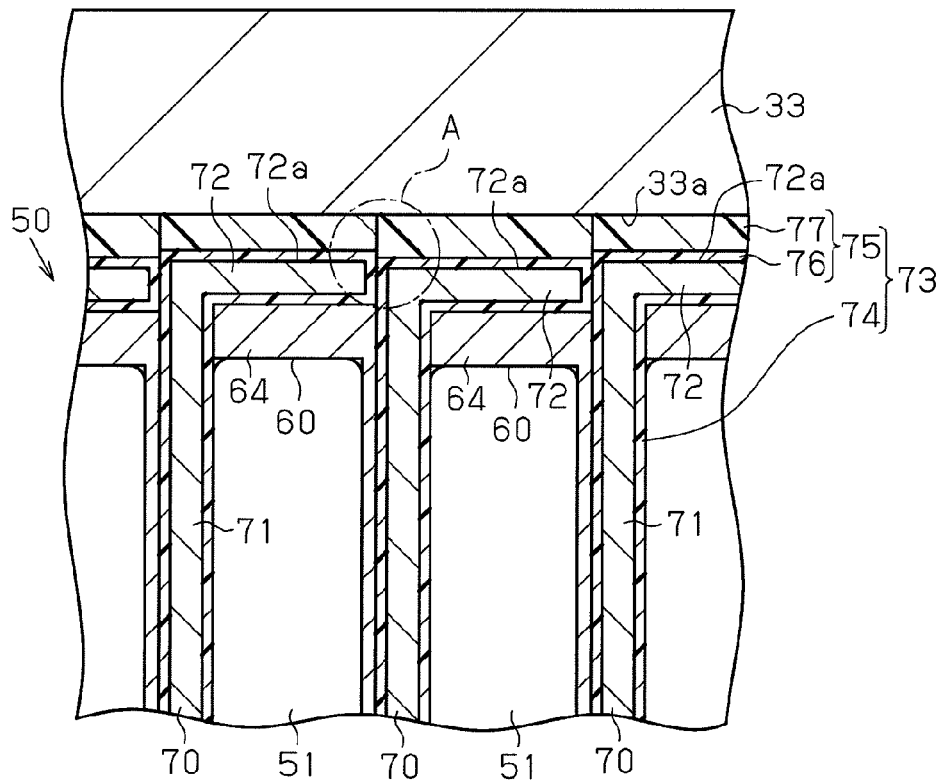
FIG. 6 is an enlarged view showing part of the battery module of FIG. 5.

As shown in FIGS. 5 and 6, a heat conductive layer 73 is arranged on the heat transfer plate 70. The heat conductive layer 73 includes a first heat conductive layer 74 and a second heat conductive layer 75. The first heat conductive layer 74 covers the entire sandwiched portion 71. That is, the first heat conductive layer 74 is in contact with the sandwiched portion 71. In addition, the first heat conductive layer 74 is in contact with a surface of a rectangular battery 51 in the thickness direction. The second heat conductive layer 75 is located on a facing surface 72a, which is one of the surfaces of the joined portion 72 in the thickness direction and opposite to the surface on which the sandwiched portion 71 is located. Thus, the second heat conductive layer 75 is in contact with the facing surface 72a. The second heat conductive layer 75 includes a third heat conductive layer 76, which covers the facing surface 72a, and a fourth heat conductive layer 77, which covers the third heat conductive layer 76. The heat conductive layer 73 is located on the end portion plate 80, which is identical in shape with the heat transfer plate 70 as described above, in the same manner as the heat transfer plate 70.

Bolts B2 extend through brackets 56, which are fixed to the end plates 52 and 53, and are fastened to the weight body 33. This fixes the battery module 50 to the weight body 33. Accordingly, the joined portions 72 of the heat transfer plates 70 are joined to the arrangement surface 33a of the weight body 33 through the second heat conductive layer 75. That is, the second heat conductive layer 75 is in contact with the weight body 33.

When the rectangular batteries 51, the battery holders 60, the heat transfer plates 70, the end portion plate 80, and the end plates 52 and 53 are coupled together, some components may be slightly misaligned from each other due to manufacturing errors as shown in section A in FIG. 6. Specifically, a manufacturing error in the insertion holes 62a of the legs 62 results in misalignment between adjacent battery holders 60 in the longitudinal direction of the first covering portion 63, for example. Consequently, the joined portions 72 of adjacent heat transfer plates 70 are misaligned from each other in the longitudinal direction of the sandwiched portion 71. Thus, not all the facing surfaces 72a of the heat transfer plates 70 are flush with one another, and a plurality of facing surfaces 72a forms an uneven surface. The unevenness may be eliminated by pressing the facing surfaces 72a to the arrangement surface 33a of the weight body 33. However, reduction of the unevenness is difficult when a binding load is applied to the battery module 50 in the arrangement direction of the rectangular batteries 51.

The space between the facing surfaces 72a of the heat transfer plates 70 and the weight body 33 is filled with the second heat conductive layer 75. That is, when the joined portions 72 are joined to the weight body 33, the thickness of the second heat conductive layer 75 between the part that is in contact with the joined portions 72 and the part that is in contact with the weight body 33 is greater on a heat transfer plate 70 that is farther from the weight body 33. This prevents formation of a gap between the facing surface 72a and the weight body 33. When the joined portions 72 are joined to the weight body 33, the thickness (thickness between the part in contact with the joined portion 72 and the part in contact with the weight body 33) of the second heat conductive layer 75 on the heat transfer plate 70 that is the farthest from the weight body 33 is greater than the thickness of the first heat conductive layer 74 (thickness between the part in contact with the sandwiched portion 71 and the part in contact with the rectangular battery 51).

A method for manufacturing the battery module 50 will now be described.

Figure 7A:
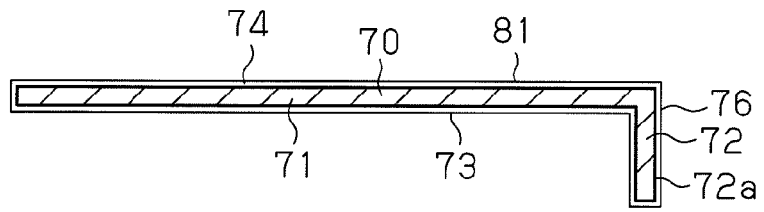
FIGS. 7A to 7C are cross-sectional views showing a method for manufacturing a battery module of the embodiment.

As shown in FIG. 7A, an overall heat conductive layer 81 is formed that covers the whole of a heat transfer plate 70. Specifically, the heat transfer plate 70 is immersed in a curable liquid heat conductive material (thermal interface material: TIM). The heat conductive material that adheres to the whole of the heat transfer plate 70 is then cured. This forms the overall heat conductive layer 81 that covers the whole of the heat transfer plate 70. In the overall heat conductive layer 81, the part that covers the sandwiched portion 71 is the first heat conductive layer 74, and the part that covers the facing surface 72a is the third heat conductive layer 76. In the present embodiment, the heat conductive material is insulative.

Figure 7B:
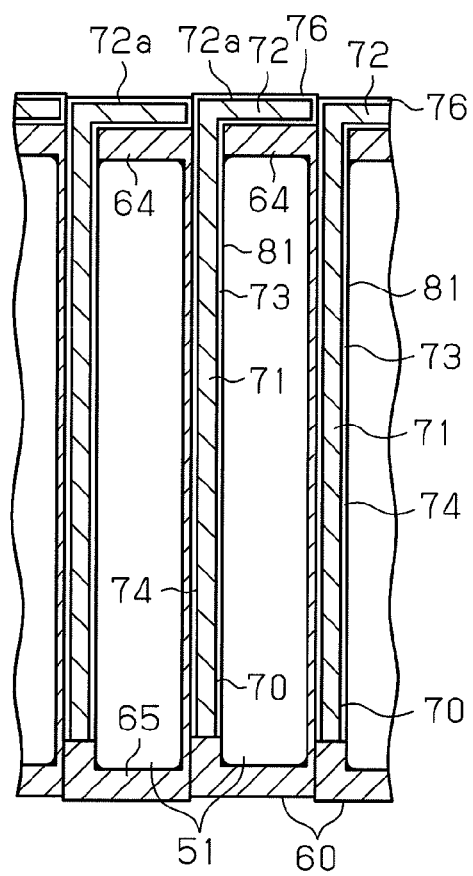

As shown in FIG. 7B, the rectangular batteries 51, the battery holders 60, the heat transfer plates 70, the end portion plate 80, and the end plates 52 and 53 are arranged and fixed together by the bolts B1 and the nuts N. At this stage, since not all the facing surfaces 72a of the heat transfer plates 70 are flush with one another, some of the facing surfaces 72a form an uneven surface.

Figure 7C:
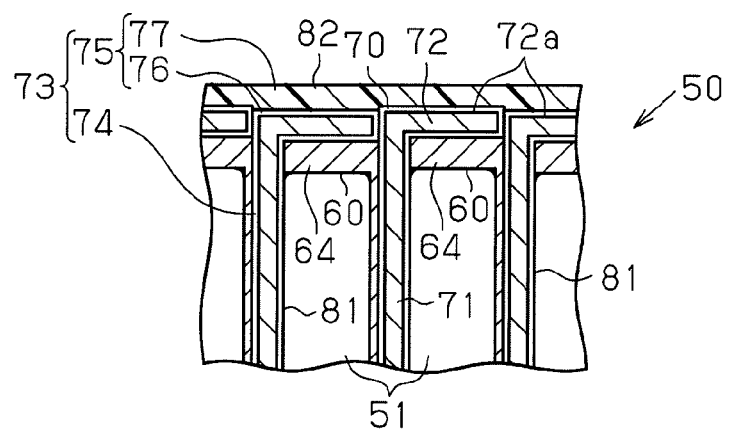

As shown in FIG. 7C, an additional heat conductive layer 82 (the fourth heat conductive layer 77) is formed to cover the overall heat conductive layers 81 formed on the facing surfaces 72a. Specifically, a curable liquid heat conductive material is applied to cover the overall heat conductive layers 81 formed on the facing surfaces 72a. The heat conductive material is applied such that the heat conductive material absorbs the unevenness of the joined portions 72, that is, a deeper depression receives more heat conductive material. When the heat conductive material is cured, the second heat conductive layer 75 is formed that includes the overall heat conductive layers 81, which cover the facing surfaces 72a, and the additional heat conductive layer 82. In other words, before the battery module 50 is fixed to the weight body 33, the facing surfaces 72a include a first facing surface and a second facing surface the relative distance between which is the longest. The second heat conductive layer 75 that covers one of the first facing surface and the second facing surface has the least thickness, and the second heat conductive layer 75 that covers the other has the greatest thickness. In other words, the second heat conductive layer 75 is thickest on the facing surface 72a that is the farthest from the weight body 33, and the second heat conductive layer 75 is thinnest on the facing surface 72a that is the closest to the weight body 33.

Operation of the battery module 50 will now be described.

In the battery module 50, the second heat conductive layer 75 formed on the heat transfer plate 70 that is the farthest from the weight body 33 is thicker than the first heat conductive layer 74. This absorbs the unevenness of the facing surfaces 72a of the heat transfer plates 70, allowing the heat transfer plate 70 that is the farthest from the weight body 33 to be joined to the weight body 33. The first heat conductive layer 74 is the layer that joins the rectangular battery 51 to the heat transfer plate 70 and does not have to be as thick as the second heat conductive layer 75. In contrast, the second heat conductive layer 75 needs to absorb unevenness of the facing surfaces 72a of the heat transfer plates 70 to join the heat transfer plates 70 to the counterweight 31 and therefore requires a thickness that can absorb the unevenness. Thus, formation of gaps between the facing surfaces 72a of the heat transfer plates 70 and the weight body 33 is restrained by varying the thickness of the heat conductive layer 73 as needed. For example, if the second heat conductive layer 75 is not formed and the entire heat transfer plate 70 is covered with the first heat conductive layer 74, a gap will tend to be formed between the weight body 33 and the heat transfer plate 70 that is the farthest from the weight body 33, and such a gap will function as a heat insulation layer that inhibits heat transfer from the heat transfer plate 70 to the weight body 33.

In the battery module 50 of the present embodiment, the heat transferred to each heat transfer plate 70 is then transferred to the weight body 33 through the second heat conductive layer 75. Thus, the weight body 33 can easily absorb the heat emitted by the rectangular batteries 51. This improves the cooling efficiency of the rectangular batteries 51.

The above described embodiment thus achieves the following advantages.

(1) In the battery module 50, the second heat conductive layer 75 formed on the facing surface 72a of the heat transfer plate 70 that is the farthest from the weight body 33 is thicker than the first heat conductive layer 74. This allows the second heat conductive layer 75 to join the weight body 33 to the heat transfer plate 70 that is the farthest from the weight body 33 without forming a gap in between. Thus, the heat emitted by the rectangular battery 51 that is the farthest from the weight body 33 is properly transferred through the heat transfer plate 70 and the second heat conductive layer 75 to the weight body 33. This improves the cooling efficiency of the rectangular batteries 51.

(2) Before the battery module 50 is fixed to the weight body 33, the thickest part of the second heat conductive layer 75 on the facing surfaces 72a of the heat transfer plates 70 is thicker than the first heat conductive layer 74. Thus, when the battery module 50 is fixed to the weight body 33, the second heat conductive layer 75 can easily absorb the unevenness. This improves the cooling efficiency of the rectangular batteries 51.

(3) The second heat conductive layer 75 includes the third heat conductive layer 76 and the fourth heat conductive layer 77. Thus, after the overall heat conductive layer 81, which covers the whole of each heat transfer plate 70, is formed, the second heat conductive layer 75 can be formed by forming the additional heat conductive layer 82 on the parts of the overall heat conductive layers 81 that cover the facing surfaces 72a. This facilitates the formation of the second heat conductive layer 75.

(4) The heat conductive layer 73 is formed of a curable liquid heat conductive material. Thus, the first heat conductive layer 74 and the third heat conductive layer 76 can be formed simply by immersing the heat transfer plate 70 in the heat conductive material. The fourth heat conductive layer 77 can be formed simply by applying the heat conductive material to the third heat conductive layer 76. For example, if the heat conductive layer 73 were formed of a sheet-shaped heat conductive material, the sheet would need to be wrapped around the heat transfer plate 70, which would complicate the process. The use of the liquid heat conductive material facilitates the formation of the heat conductive layer 73 compared to when a sheet-shaped heat conductive material is used.

(5) The counterweight 31 (the weight body 33) functions as the joint body. The use of the counterweight 31, which is conventionally included in the forklift 10, as the joint body reduces the number of components compared to a structure in which an additional joint body is provided.

(6) The fourth heat conductive layer 77 is formed after the third heat conductive layer 76 is formed on each heat transfer plate 70 and the heat transfer plates 70 are coupled with the rectangular batteries 51, the battery holders 60, and the end plates 52 and 53. Thus, when the surface formed by a plurality of facing surfaces 72a is uneven after the heat transfer plates 70 are coupled, the fourth heat conductive layer 77 absorbs the unevenness. This limits formation of gaps between the facing surfaces 72a and the weight body 33 when the battery module 50 is fixed to the weight body 33.

(7) The formation of the heat conductive layer 73 on the heat transfer plate 70 insulates the heat transfer plate 70 from the rectangular battery 51. If the insulation between the heat transfer plate 70 and the rectangular battery 51 were achieved by forming a heat conductive layer on the rectangular battery 51 and the heat conductive layer covered the whole of the rectangular battery 51, a greater amount of heat conductive material would be needed than when a heat conductive layer covers the heat transfer plate 70. Further, if a heat conductive layer were formed only on the part of the rectangular battery 51 that contacts the heat transfer plate 70, the process would be complicated. The formation of the heat conductive layer 73 on the heat transfer plate 70 reduces the amount of heat conductive material needed to form the heat conductive layer 73.

The above illustrated embodiment may be modified as follows.

Provided that the second heat conductive layer 75 contacts the weight body 33 when the battery module 50 is coupled to the weight body 33 and that the thickest part of the second heat conductive layer 75 is thicker than the first heat conductive layer 74, the second heat conductive layer 75 may be formed of a material that differs from the material of the first heat conductive layer 74. For example, the material of the second heat conductive layer 75 may be softer than the material of the first heat conductive layer 74.

The second heat conductive layer 75 may include three or more layers. In addition, the first heat conductive layer 74 may include two or more layers.

In the present embodiment, the heat conductive layer 73 is formed of a curable liquid heat conductive material. However, the present invention is not limited to such an embodiment, and a heat conductive sheet may be used, for example.

In the present embodiment, after the first heat conductive layer 74 and the third heat conductive layer 76 are formed on each heat transfer plate 70, the rectangular batteries 51, the battery holders 60, the heat transfer plates 70, and the end plates 52 and 53 are assembled together before the fourth heat conductive layer 77 is formed.

However, the present invention is not limited to such an embodiment. For example, the first heat conductive layer 74 and the second heat conductive layer 75 may be formed in advance on the heat transfer plate 70.

The joint body may be other than the counterweight 31. For example, when the battery module 50 is accommodated in a housing and fixed to a side wall of the housing, the side wall serves as the joint body.

The first heat conductive layer 74 may have any shape. For example, when the central sections of the opposite sides of the rectangular battery 51 in the thickness direction slightly protrude in the thickness direction of the rectangular battery 51, the first heat conductive layer 74 may be thinner in the part that faces the protruding part of the rectangular battery 51, and the first heat conductive layer 74 may be thicker in the part that faces the part of the rectangular battery 51 that does not protrude. This limits formation of gaps between the first heat conductive layer 74 and the opposite sides of the rectangular battery 51 in the thickness direction, thereby improving the cooling efficiency of the rectangular batteries 51.

The second heat conductive layer 75 does not have to be located on the heat transfer plate 70 that is the closest to the weight body 33. In other words, in the illustrated embodiment, the facing surface 72a of the heat transfer plate 70 that is the closest to the weight body 33 may be in contact with the weight body 33.

If the surfaces of the rectangular battery 51 (case of the rectangular battery 51) in the thickness direction are insulative, a non-insulative heat conductive material may be used as the first heat conductive layer 74.

The first heat conductive layer 74 may be in contact with a plurality of rectangular batteries 51. For example, if the battery holder 60 is shaped such that each side of a rectangular battery 51 in the thickness direction is in contact with a heat transfer plate 70, the first heat conductive layer 74 is in contact with surfaces of two adjacent rectangular batteries 51 in the thickness direction.

The battery module 50 may include a plate that does not include the joined portion 72. For example, of the rectangular batteries 51, the rectangular batteries 51 that are located on the opposite ends in the arrangement direction of the rectangular batteries 51 are unlikely to accumulate less heat, and thus heat dissipation to the weight body 33 by means of the heat transfer plate 70 may not be necessary in these rectangular batteries 51. In this case, plates that do not include the joined portion 72 may replace the heat transfer plates 70 (or the end portion plate 80) that are coupled to the rectangular batteries 51 on the opposite ends in the arrangement direction. This reduces temperature variation among the rectangular batteries 51.

The battery module 50 may include a plate that does not include the first heat conductive layer 74.

The industrial vehicle may be an excavator.

The invention claimed is:

1. A battery module configured to be joined to a joint body, the battery module comprising:
   a plurality of battery cells; and
   a plurality of heat transfer plates, each of which is located between adjacent ones of the battery cells, wherein:
   each heat transfer plate includes a sandwiched portion, which is located between adjacent ones of the battery cells, and a joined portion, which is configured to be joined to the joint body and includes a facing surface that faces the joint body;
   a first heat conductive layer that is in contact with at least one of the battery cells is located on the sandwiched portion of each heat transfer plate, wherein the first heat conductive layer has a first thickness between a part that is in contact with the sandwiched portion and a part that is in contact with the battery cell;
   a second heat conductive layer is located on the facing surface of each of the heat transfer plates except for one of the heat transfer plates that is the closest to the joint body when the joined portions are joined to the joint body, wherein the second heat conductive layer is configured to contact the joint body; and
   the second heat conductive layer on one of the heat transfer plates that is the farthest from the joint body when the joined portions are joined to the joint body has a second thickness between a part that is in contact with the joined portion and a part that is in contact with the joint body, and the second thickness is greater than the first thickness.

2. The battery module according to claim 1, wherein the second heat conductive layer includes a plurality of layers.

3. The battery module according to claim 1, wherein the heat conductive layers are formed by curing a curable liquid heat conductive material.

4. The battery module according to claim 1, wherein the joint body is a counterweight of an industrial vehicle.

5. A method for manufacturing a battery module that is configured to be joined to a joint body, wherein the battery module includes a plurality of battery cells and a plurality of heat transfer plates, and each heat transfer plate includes a sandwiched portion, which is sandwiched between adjacent ones of the battery cells, and a joined portion that is configured to be joined to the joint body and includes a facing surface that faces the joint body, the method comprising:
   forming an overall heat conductive layer that covers the sandwiched portions and the joined portions;
   coupling the battery cells to the heat transfer plates; and
   forming an additional heat conductive layer that covers the overall heat conductive layer formed on the facing surfaces of the joined portions.

\* \* \* \* \*